(12) United States Patent
O'Sullivan et al.

(10) Patent No.: US 9,275,372 B2
(45) Date of Patent: Mar. 1, 2016

(54) CONTROLLING ACTIVE AND PASSIVE PARTICIPATION IN A THREAD OF CONVERSATION

(75) Inventors: Patrick J. O'Sullivan, Dublin (IE); Cynthia E. Barber-Mingo, Westford, MA (US); Gary Denner, Co. Kildare (IE); Cora Clerkin, Co. Louth (IE); Sonya Purcell, Co. Tipperary (IE)

(73) Assignee: International Business Machines Corporation, Armonk, NY (US)

( * ) Notice: Subject to any disclaimer, the term of this patent is extended or adjusted under 35 U.S.C. 154(b) by 1097 days.

(21) Appl. No.: 11/538,200

(22) Filed: Oct. 3, 2006

(65) Prior Publication Data
US 2008/0082609 A1    Apr. 3, 2008

(51) Int. Cl.
*H04L 12/58* (2006.01)
*G06Q 10/10* (2012.01)
*H04L 29/06* (2006.01)

(52) U.S. Cl.
CPC ............ *G06Q 10/107* (2013.01); *H04L 12/581* (2013.01); *H04L 51/04* (2013.01); *H04L 51/14* (2013.01); *H04L 65/4038* (2013.01)

(58) Field of Classification Search
CPC ...... G06Q 10/107; H04L 12/26; H04L 43/00; H04L 43/04; H04L 43/045; H04L 43/08; H04L 51/00; H04L 51/02; H04L 51/04; H04L 51/0612; H04L 51/14; H04L 51/26; H04L 51/32
USPC ........... 709/204–207; 715/733, 741, 751, 758
See application file for complete search history.

(56) References Cited

U.S. PATENT DOCUMENTS

| | | | |
|---|---|---|---|
| 5,794,006 A * | 8/1998 | Sanderman | 709/223 |
| 5,880,731 A * | 3/1999 | Liles | H04L 12/1827 345/473 |
| 5,956,491 A * | 9/1999 | Marks | 709/250 |
| 6,345,290 B2 * | 2/2002 | Okada et al. | 709/204 |
| 6,480,885 B1 | 11/2002 | Olivier | |
| 7,370,269 B1 * | 5/2008 | Prabhu et al. | 715/230 |
| 2002/0097267 A1 * | 7/2002 | Dinan et al. | 345/757 |
| 2003/0037112 A1 * | 2/2003 | Fitzpatrick et al. | 709/205 |
| 2003/0041165 A1 * | 2/2003 | Spencer et al. | 709/233 |
| 2003/0097404 A1 * | 5/2003 | Sakakibara et al. | 709/203 |
| 2003/0156134 A1 * | 8/2003 | Kim | 345/753 |
| 2003/0225833 A1 * | 12/2003 | Pilat et al. | 709/204 |
| 2004/0255032 A1 * | 12/2004 | Danieli | 709/229 |
| 2005/0149987 A1 * | 7/2005 | Boccon-Gibod et al. | 725/135 |
| 2006/0244818 A1 * | 11/2006 | Majors et al. | 348/14.08 |
| 2007/0255791 A1 * | 11/2007 | Bodlaender et al. | 709/206 |
| 2008/0034040 A1 * | 2/2008 | Wherry et al. | 709/204 |

* cited by examiner

*Primary Examiner* — Eric W Shepperd
(74) *Attorney, Agent, or Firm* — Steven M. Greenberg, Esq.; CRGO Law

(57) ABSTRACT

Embodiments of the present invention address deficiencies of the art in respect to instant messaging and persistent chats and provide a method, system and computer program product for controlling active and passive participation among participants in a thread of conversation in an instant messaging session or persistent chat. In one embodiment of the invention, a method for controlling active and passive participation among participants in a thread of conversation can be provided. The method can include creating a thread of conversation in a messaging system, adding participants to the thread, classifying the participants as one of either active or passive, and permitting only those participants classified as active participants to post to the thread while providing merely a view of the thread to the passive participants.

20 Claims, 2 Drawing Sheets

CONTROLLING ACTIVE AND PASSIVE PARTICIPATION IN A THREAD OF CONVERSATION

BACKGROUND OF THE INVENTION

1. Field of the Invention

The present invention relates to the field of collaborative computing and more particularly to instant messaging and chat systems.

2. Description of the Related Art

Real time communications systems provide a substantial enhancement over more traditional, asynchronous communications systems. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications systems lack several elements common in the realm of real time communications systems. In particular, the seemingly instant delivery of a message cannot be experienced in the world of electronic mail. In an real-time society, the minor latencies associated with electronic mail often cannot be suitable for the task at hand where a real-time conversation will be required in addressing a problem or performing a collaborative task. More importantly, often the feel and nature of a "conversation" as it is known to human beings only can be approximated through real time communications where the participants to a conversation feel the spontaneity of an exchange of ideas, much as is the case in a live, face-to-face conversation.

The recent rapid development of the Internet has led to advanced modes of synchronous, real-time collaboration able to fulfill the real-time communicative requirements of the modern computing participant. Using the Internet as a backbone, individuals worldwide can converge in real-time in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include several human-to-human collaborative environments such as instant messaging, application sharing, shared document libraries and persistent chat rooms.

While instant messaging systems ordinarily are viewed to include on two conversants, advanced uses of instant messaging systems support a multiplicity of collaborators in a single thread of conversation. In either circumstance, current instant messaging and chat systems provide for an initiator of a thread of conversation, and one or more invited participants. Advanced messaging configurations permit the initiator of the thread of conversation to fulfill the role of moderator in setting the time of the session, the participants of the session and the duration of the session in advance of initiating the thread of conversation.

Frequent users of instant messaging systems and persistent chats will attest to the confusion and disorganization that can arise when many participants engage in a thread of conversation in an instant messaging system or persistent chat. While the moderator for the thread of conversation initially can establish a topic of conversation, participants easily and often digress into one or more side conversations. Given the limited screen real estate dedicated to a chat session, following a multi-topic discussion in a single thread of conversation can be quite challenging and oftentimes, important contributions can become overlooked in consequence.

BRIEF SUMMARY OF THE INVENTION

Embodiments of the present invention address deficiencies of the art in respect to instant messaging and persistent chats and provide a novel and non-obvious method, system and computer program product for controlling active and passive participation among participants in a thread of conversation in an instant messaging session or persistent chat. In one embodiment of the invention, a method for controlling active and passive participation among participants in a thread of conversation can be provided. The method can include creating a thread of conversation in a messaging system, adding participants to the thread, classifying the participants as one of either active or passive, and permitting only those participants classified as active participants to post to the thread while providing merely a view of the thread to the passive participants. Optionally, participants added to a thread can be pre-classified by default as one of an active participant or a passive participant, for example as specified by a classification policy.

In one aspect of the embodiment, the method further can include selectively muting at least one of the active participants. Additionally, in a second aspect of the embodiment, the method further can include reclassifying a participant from one of either active to passive and passive to active. In another aspect of the embodiment, the method can include receiving a request from a participant to become reclassified from one of either active to passive and passive to active, and, in response to the request, reclassifying the participant from one of either active to passive and passive to active according to the request. In yet another aspect of the embodiment, the method further can include receiving a request from a participant to change a topic of conversation for the thread. In even yet another aspect of the embodiment, the method further can include queuing posts from the active participants, and applying the posts to the thread in a sequence specified by the queuing. Finally, the method further can include delegating the classifying of the participants as one of either active or passive to another of the participants.

In another embodiment of the invention, a messaging data processing system can be provided. The system can include a chat thread processing module, a messaging user interface, and moderator control logic. The moderator control logic can include program code enabled to classify participants in a thread of conversation as one of either active or passive, and to permit only those participants classified as active participants to post to the thread while providing merely a view of the thread to the passive participants. In one aspect of the embodiment, the moderator control logic also can include program code enabled to additionally mute selected ones of the active participants.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for controlling active and passive participation among participants in a thread of conversation. In accordance with an embodiment of the present invention, participants to a thread of conversation in an instant messaging session or chat session can be classified as active or passive participants. Active participants can freely post messages to the thread, whereas passive participants only can view postings. Active participants and passive participants can be reclassified throughout the duration of the thread from active to passive, or passive to active. Additionally, active participants can be muted and re-activated sua sponte throughout the duration of the thread.

Figure 1:
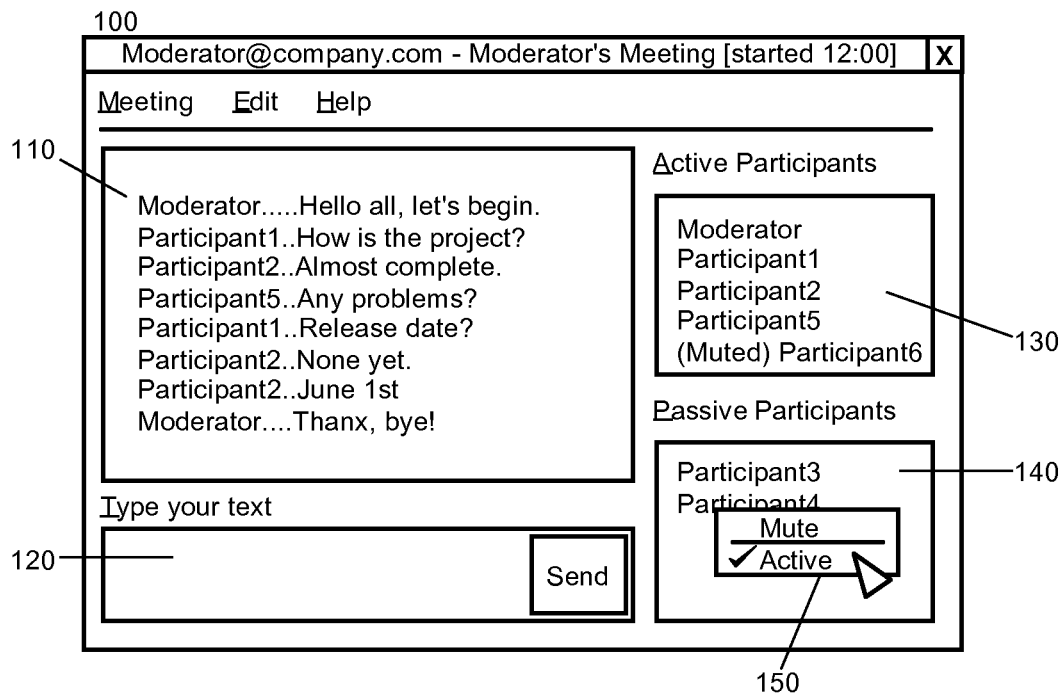
FIG. 1 is a screen shot of illustrating an exemplary user interface for an instant messaging client configured for controlling active and passive participation among participants in a thread of conversation.

In illustration, FIG. 1 is a screen shot of illustrating an exemplary user interface for an instant messaging client configured for controlling active and passive participation among participants in a thread of conversation. As shown in FIG. 1, a user interface 100 for an instant messaging or chat session can include a thread display 110 and a text entry field 120. Participants to the thread of conversation can be grouped into active and passive groups. Participants to the thread of conversation having been classified as active can be displayed in the active view 130. Conversely, participants to the thread of conversation having been classified as passive can be displayed in the passive view 140.

Notably, participants to the thread of conversation, whether classified as active or passive, can be re-classified at any time during the thread of conversation. To that end, a pop-up menu 150 can be rendered in association with a selected participant to the thread of conversation in either the active view 130 or passive view 140. The pop-up menu 150 can provide an interface element for re-classifying the selected participant from active to passive, or from passive to active as the case may be. Additionally, the pop-up menu 150 can provide an interface element for muting the selected participant such that attempted postings by the selected participant will be suppressed from view in the thread display 110 until such time as the muting is deactivated.

Figure 2:
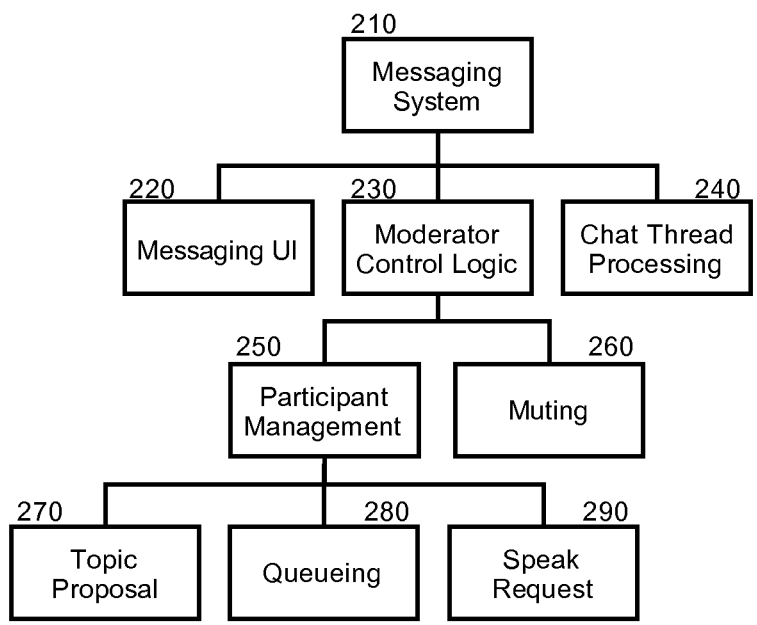
FIG. 2 is a block diagram illustrating an architecture for a messaging data processing system configured for controlling active and passive participation among participants in a thread of conversation.

In further illustration, FIG. 2 is a block diagram illustrating an architecture for a messaging data processing system configured for controlling active and passive participation among participants in a thread of conversation. The messaging system architecture can include a messaging system 210 such as an instant messaging system or a persistent chat system, to name only two. The messaging system 210 can include a messaging user interface 220 and chat thread processing 240. The chat thread processing 240 can provide logic configured to manage the conduct of a thread of conversation in the messaging system 210. The messaging user interface 220 in turn can provide a display to the thread of conversation.

Notably, moderator control logic 230 can be provided in association with the messaging system 210. The moderator control logic 230 can include moderation tools for moderating the conduct of a thread of conversation and can be provided to a selected group of participants to a thread of conversation, for example the thread moderator. The moderator control logic 230 can provide both participant management 250 and muting 260. Muting 260 can selectively suppress postings from selected participants on an ad hoc basis. Participant management 250, by comparison, can accept and process participant requests to influence the moderation of the thread of conversation.

In this regard, participant management 250 can include topic proposals 270, queuing 280 and speak requests 290. Topic proposals 270 provide functionality for participants to privately message the moderator requesting a change in the topic of discussion in the thread of conversation. Queuing 280 can include the ordered sequencing of permission for different participants to post to the thread of conversation in order to avoid out-of-sync postings. Finally, speak requests 290 provides functionality for participants to privately request permission to be reclassified from passive to active.

Figure 3:
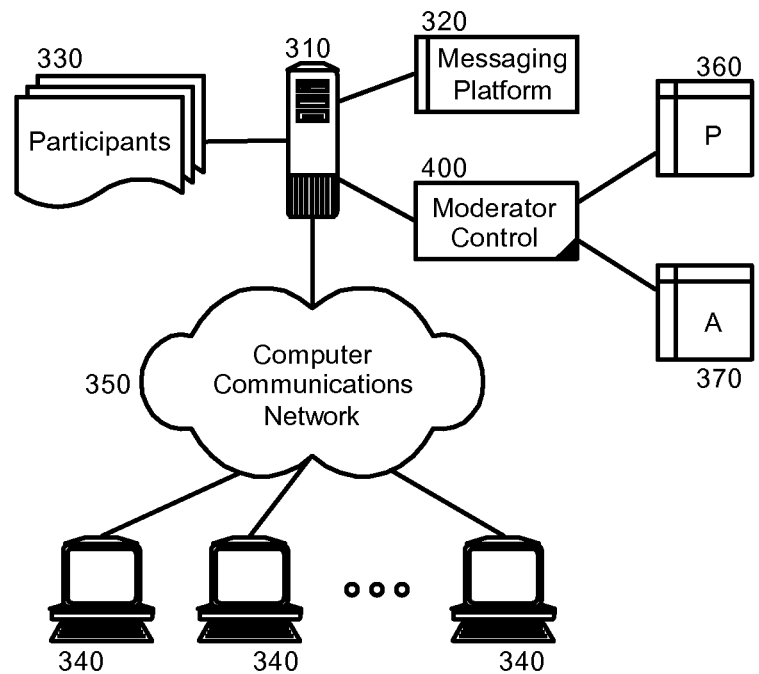
FIG. 3 is a schematic illustration of a messaging data processing system configured for controlling active and passive participation among participants in a thread of conversation; and, FIG. 4 is a flow chart illustrating a process for controlling active and passive participation among participants in a thread of conversation.

In yet further illustration, FIG. 3 is a schematic illustration of a messaging data processing system configured for controlling active and passive participation among participants in a thread of conversation. The system can include a messaging server 310 coupled to one or more messaging clients 340 over computer communications network 350. The messaging server 310 can support the operation of a messaging platform 320 for one or more participants 330 registered to participate in a thread of conversation hosted by the messaging platform 320.

Notably, moderator control logic 400 can be coupled to the messaging server 310. The moderator control logic 400 can include program code enabled to classify different ones of the participants 330 to a thread of conversation as either active participants 370 or passive participants 360. Active participants 370 can post freely to the thread of conversation whereas passive participants 360 can merely observe the postings of other participants to the thread of conversation. The program code of the moderator control logic 400 further can be enabled to selectively mute individual ones of the active participants 370. Finally, the program code of the moderator control logic 400 can permit the delegation of the power to classify, re-classify and mute to others of the participants 330.

Figure 4:
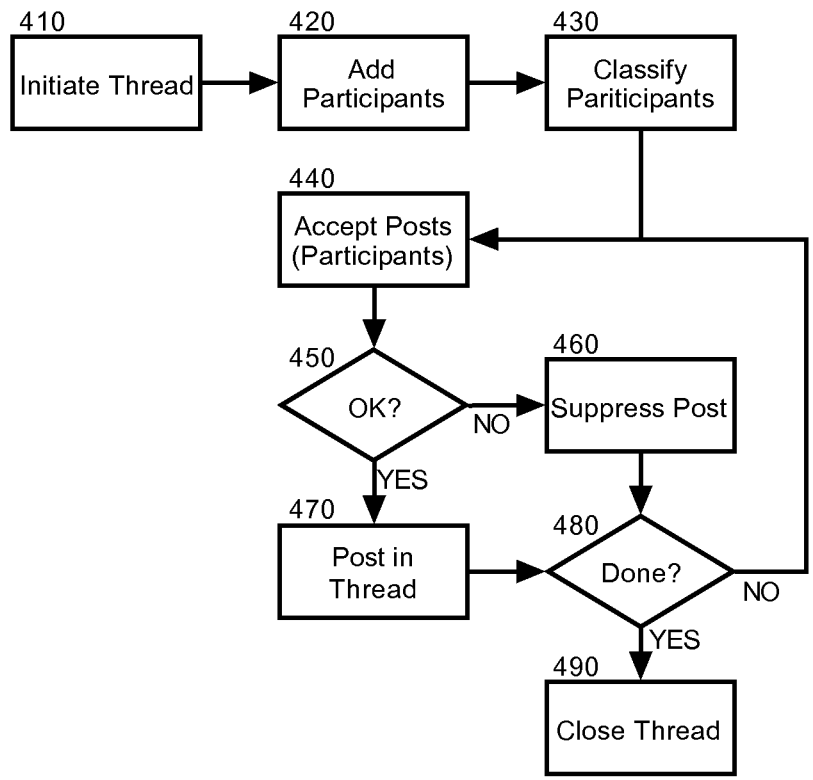

In even yet further illustration, FIG. 4 is a flow chart illustrating a process for controlling active and passive participation among participants in a thread of conversation. Beginning in block 410, a thread can be initiated and one or more participants can be added to the thread in block 420. In block 430, the participants can be classified as either active or passive. In block 440, the thread can proceed and a post can be accepted from one of the participants. In decision block 450, it can be determined whether the classification of the participant is permitted given the classification of the participant and the mute status of the participant. If not, in block 460 the post can be suppressed. Otherwise, in block 470 the post can be added to the thread. Thereafter, in decision block 480, if the thread is not yet complete the process can repeat through block 440. When the thread has completed, in block 490 the thread can be closed.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for controlling active and passive participation among participants in a thread of conversation, comprising:
   creating a thread of conversation in a messaging system;
   adding a plurality of participants to the thread;
   classifying each of the participants as one of either active or passive so as to create a group of active participants and a group of passive participants;
   permitting only those participants classified as active participants to post to the thread while providing merely a view of the thread to the passive participants the view not permitting entry of posts to the thread by those participants in the group of passive participants but the view allowing the participants in the group of passive participants to view postings from the participants in the group of active participants; and,
   establishing a sequence in a queue in which each of the active participants are permitted to post to the thread and ordering posts from the active participants to the thread in accordance to the sequence so as to avoid out-of-sync posts to the thread.

2. The method of claim 1, further comprising reclassifying a participant from one of either active to passive and passive to active.

3. The method of claim 1, further comprising:
   receiving a request from a participant to become reclassified from one of either active to passive and passive to active; and,
   responsive to the request, reclassifying the participant from one of either active to passive and passive to active according to the request.

4. The method of claim 1, further comprising receiving a request from a participant to change a topic of conversation for the thread.

5. The method of claim 1, further comprising delegating the classifying of the participants as one of either active or passive to another of the participants.

6. The method of claim 1, wherein adding a plurality of participants to a thread, further comprises pre-classifying each of the added participants by default as one of an active participant or a passive participant.

7. The method of claim 1, further comprising muting one of the active participants, the muting permanently suppressing posts to the thread by the muted one of the active participants and allowing subsequent posts to the thread by the muted one of the active participants only subsequent to the muted one of the active participants becoming unmuted.

8. The method of claim 1, further comprising:
   receiving from a participant classified as passive a request to be re-classified to active; and,
   responding to the request by reclassifying the participant from whom the request is received as active.

9. The method of claim 1, further comprising:
   receiving from a participant a request to change a topic of the thread; and,
   responding to the request by changing the topic of the thread.

10. A messaging data processing system comprising:
    a chat thread processing module;
    a messaging user interface; and,
    moderator control logic comprising program code enabled to classify each of the participants as one of either active or passive so as to create a group of active participants and a group of passive participants, to permit only those participants classified as active participants to post to the thread while providing merely a view of the thread to the passive participants the view not permitting entry of posts to the thread by those participants in the group of passive participants but the view allowing the participants in the group of passive participants to view postings from the participants in the group of active participants and, to establish a sequence in a queue in which each of the active participants are permitted to post to the thread and ordering posts from the active participants to the thread in accordance to the sequence so as to avoid out-of-sync posts to the thread.

11. The system of claim 10, wherein the program code is further enable to mute one of the active participants, the muting permanently suppressing posts to the thread by the muted one of the active participants and allowing subsequent posts to the thread by the muted one of the active participants only subsequent to the muted one of the active participants becoming unmuted.

12. A computer program product comprising a computer usable storage medium comprising a memory device having computer usable program code for controlling active and passive participation among participants in a thread of conversation, the computer program product including:

computer usable program code for creating a thread of conversation in a messaging system;

computer usable program code for adding a plurality of participants to the thread;

computer usable program code for classifying each of the participants as one of either active or passive so as to create a group of active participants and a group of passive participants;

computer usable program code for permitting only those participants classified as active participants to post to the thread while providing merely a view of the thread to the passive participants the view not permitting entry of posts to the thread by those participants in the group of passive participants but the view allowing the participants in the group of passive participants to view postings from the participants in the group of active participants; and, computer usable program code for establishing a sequence in a queue in which each of the active participants are permitted to post to the thread and ordering posts from the active participants to the thread in accordance to the sequence so as to avoid out-of-sync posts to the thread.

13. The computer program product of claim 12, further comprising computer usable program code for reclassifying a participant from one of either active to passive and passive to active.

14. The computer program product of claim 12, further comprising:

computer usable program code for receiving a request from a participant to become reclassified from one of either active to passive and passive to active; and, computer usable program code for reclassifying the participant from one of either active to passive and passive to active according to the request in response to the request.

15. The computer program product of claim 12, further comprising computer usable program code for receiving a request from a participant to change a topic of conversation for the thread.

16. The computer program product of claim 12, further comprising computer usable program code for delegating the classifying of the participants as one of either active or passive to another of the participants.

17. The computer program product of claim 12, wherein the computer usable program code for adding a plurality of participants to a thread, further comprises computer usable program code for pre-classifying each of the added participants by default as one of an active participant or a passive participant.

18. The computer program product of claim 12, further comprising computer usable program code for muting one of the active participants, the muting permanently suppressing posts to the thread by the muted one of the active participants and allowing subsequent posts to the thread by the muted one of the active participants only subsequent to the muted one of the active participants becoming unmuted.

19. The computer program product of claim 12, further comprising:

computer usable program code for receiving from a participant classified as passive a request to be re-classified to active; and, computer usable program code for responding to the request by reclassifying the participant from whom the request is received as active.

20. The computer program product of claim 12, further comprising:

computer usable program code for receiving from a participant a request to change a topic of the thread; and, computer usable program code for responding to the request by changing the topic of the thread.

* * * * *